(12) United States Patent
Dowich (10) Patent No.: US 12,453,313 B2
(45) Date of Patent: Oct. 28, 2025

(54) ADJUSTABLE GRAIN SCREEN AND METHODS FOR USING THE SAME

(71) Applicant: Marta Lindenmayr Döwich, Cascavel (BR)

(72) Inventor: Gerhard Dowich, Erval Seco (BR)

(73) Assignee: Marta Lindenmayr Döwich, Cascavel (BR)

( * ) Notice: Subject to any disclaimer, the term of this patent is extended or adjusted under 35 U.S.C. 154(b) by 883 days.

(21) Appl. No.: 17/765,209

(22) PCT Filed: Sep. 30, 2020

(86) PCT No.: PCT/BR2020/050389
§ 371 (c)(1),
(2) Date: Aug. 11, 2022

(87) PCT Pub. No.: WO2021/062505
PCT Pub. Date: Apr. 8, 2021

(65) Prior Publication Data
US 2022/0369563 A1 Nov. 24, 2022

(30) Foreign Application Priority Data
Sep. 30, 2019 (BR) .......................... 102019020537-7

(51) Int. Cl.
*A01F 12/44* (2006.01)
(52) U.S. Cl.
CPC .................................. *A01F 12/448* (2013.01)
(58) Field of Classification Search
CPC ............................. A01F 12/448; A01F 12/446
See application file for complete search history.

(56) References Cited

U.S. PATENT DOCUMENTS

| | | | | |
|---|---|---|---|---|
| 579,793 | A | * | 3/1897 | Ditch ........................ B07B 1/12 209/394 |
| 925,623 | A | * | 6/1909 | Closz ........................ B07B 1/12 209/394 |

(Continued)

FOREIGN PATENT DOCUMENTS

| | | |
|---|---|---|
| BR | MU8403321 U | 6/2006 |
| BR | 102018068431 A2 | 4/2019 |

(Continued)

OTHER PUBLICATIONS

International Search Report in international application No. PCT/BR2020/050389 mailed Dec. 18, 2020, 2 pages.

(Continued)

*Primary Examiner* — Arpad Fabian-Kovacs
(74) *Attorney, Agent, or Firm* — Berg Hill Greenleaf Ruscitti LLP (57) ABSTRACT

Adjustable screen comprising scales (1) consisting of teeth (1.1) interspersed with bases (1.2), an inclined tab (1.3) on the rear portion and a channel (1.4) between the inclined tab (1.3) and teeth (1.1) for the introduction of the shafts (3.1) for moving the scales, the teeth (1.1) being fluted and the bases (1.2) being flat. It also comprises partitions (2.1) fastened at the ends (2.2) between the sides (2.3) of the structure of the screen (2) and a mechanism for adjusting the scales (3) made up of shafts (3.1) rotating in orifices (2.6) of the sides (2.3) of the structure of the screen (2). After the orifices (2.6), the shafts (3.1) have an S-shaped bend (3.2) for introduction into the orifices (3.4) of the ruler (3.3) in the outer face of the side of the screen (2.3). The end (2.2) has an orifice (2.7) on which a spindle (3.5) with a rotating lever (3.6) is mounted. An elastic part (3.8) flanked by protective elements (3.7) is mounted on the spindle (3.5).

3 Claims, 6 Drawing Sheets

(56) References Cited

U.S. PATENT DOCUMENTS

| | | | | |
|---|---|---|---|---|
| 2,253,296 | A * | 8/1941 | Holtzman | A01F 12/446 209/394 |
| 2,413,382 | A * | 12/1946 | Sargent | A01F 12/446 209/394 |
| 3,334,744 | A * | 8/1967 | James | A01F 12/446 209/394 |
| 3,385,438 | A * | 5/1968 | Fisher | B07B 1/46 209/394 |
| 4,502,493 | A * | 3/1985 | Jones | A01F 12/448 209/394 |
| 4,511,466 | A * | 4/1985 | Jones | A01F 12/446 209/394 |
| 4,712,568 | A * | 12/1987 | Strong | A01F 12/448 460/109 |
| 4,770,190 | A * | 9/1988 | Barnett | A01F 12/446 209/394 |
| 4,897,072 | A * | 1/1990 | Bestland | A01F 12/448 460/99 |
| 5,041,059 | A * | 8/1991 | Ricketts | A01F 12/446 460/902 |
| 5,085,616 | A * | 2/1992 | Matousek | A01F 12/44 209/394 |
| 5,176,574 | A * | 1/1993 | Matousek | A01F 12/446 460/902 |
| 5,462,174 | A * | 10/1995 | Truckenbrod | A01F 12/446 209/394 |
| 6,053,812 | A * | 4/2000 | Loewen | A01F 12/448 460/109 |
| 6,468,154 | B1 * | 10/2002 | Eggenhaus | A01F 12/448 460/109 |
| 6,843,719 | B1 * | 1/2005 | Sacquitne | A01D 75/282 460/9 |
| 6,953,397 | B2 * | 10/2005 | Jonckheere | A01F 12/448 460/42 |
| 7,497,775 | B1 * | 3/2009 | Claerhout | A01F 12/446 460/101 |
| 7,997,967 | B2 * | 8/2011 | Ricketts | A01F 12/446 209/394 |
| 9,149,002 | B2 * | 10/2015 | Bischoff | A01F 12/446 |
| 10,064,336 | B2 * | 9/2018 | Reinecke | A01F 12/446 |
| 10,959,380 | B2 * | 3/2021 | Murray | A01F 12/448 |
| 11,064,656 | B1 * | 7/2021 | Kile | A01D 41/1276 |
| 2019/0082597 | A1 * | 3/2019 | Maney | G01D 5/145 |

FOREIGN PATENT DOCUMENTS

| | | | | |
|---|---|---|---|---|
| DE | 102020109810 A1 * | 10/2021 | | A01F 12/448 |
| EP | 3707987 A1 * | 9/2020 | | A01D 41/1276 |
| GB | 2031302 A * | 4/1980 | | A01F 12/446 |

OTHER PUBLICATIONS

Written Opinion/International Preliminary Examination Report in international application No. PCT/BR2020/050389 mailed Dec. 18, 2020, 9 pages.

* cited by examiner

ADJUSTABLE GRAIN SCREEN AND METHODS FOR USING THE SAME

CROSS REFERENCE TO RELATED APPLICATION

This application is a national stage application under 35 U.S.C. 371 of PCT Application No. PCT/BR2020/050389 having an international filing date of Sep. 30, 2020, which designated the United States, which PCT application claimed the benefit of Brazil Application Serial No. BR 102019020537-7, filed Sep. 30, 2019, both of which are incorporated by reference in their entirety.

BACKGROUND OF THE INVENTION

The present invention pertains to the technology field of farming equipment and more specifically refers to the improvement developed for a grain screen endowed with enhanced scales, as well as a new method of adjusting the inclination of the scales relative to the structure of the screen that enables it to be used for different grain types and sizes. The present invention basically comprises scales with a standard format which, through the implementation thereof, is capable of enabling different grain crops to be cleaned.

BACKGROUND

Today there is a marked growth of the farming sector with the ongoing development of new technological solutions applied to machinery and their mechanical component elements in order to streamline farming processes and production of the sector in question. Agricultural mechanization began during the 18th century and firstly ploughs were developed, pulled by animals and having a structure that perforates the soil for seed sowing. It can be said that this solution was a step forward in view of the manual sowing process at the time. Later on, animals were replaced by tractors creating further growth for the agricultural sector, bearing in mind the facility of the resulting farming process. From then onwards, farming implements known today began to be developed, serving the countless activities for the most varied products that can be seen in the agricultural sector.

In 1831, the American inventor Cyrus McCormick patented the first machine developed to carry out the harvesting process, called mechanical reaper, which represented the first mechanized alternative that enabled the bundling of harvested grains for subsequent stockpiling. This was the first step towards creating the harvesters used today mainly in plantations of sugar cane, cotton and grains such as what, rice, coffee, soybean, corn, etc. Another inventor of reapers was ObedHussey who tested and patented solutions in 1833 and became the biggest competitor of Cyrus.

Reapers ultimately triggered an improvement in the quality of the harvested product, because besides the faster harvest, based on the implementation of technology, the harvested product can have a lower quantity of impurities. Furthermore, the mechanical harvesting process also depends on good planning and, bearing in mind the increased diversity of corn-based products, ongoing efforts to streamline harvesting are crucial. With this aim, the technology sector of farming implements has been diversifying in favor of greater efficiency and speed, resulting in a significant increase in production from total mechanization of the activity of grain harvesting.

Once harvested, the grains pass through a screen where the cleaning process of the harvested product occurs. The drawback in this process are the different sizes of the grains and also the diversity of types of impurities, requiring the installation of a different screen for each harvest. For more precise cleaning, the screen has scales (scale screen), designed for each grain size commonly harvested by mechanical harvesters. Therefore, depending on the type and diameter of the grain, a variable-height scale screen is applied on the harvester according to the characteristic of the crop grain to be harvested.

To solve this problem, a system was proposed to clean various types of grains, object of patent document MU 8602823-5, entitled "LOWER SELF-LEVELLING STRAW WALKER FOR HARVESTERS", which describes the use of a chute with automatic height setting comprising dumper scales. Despite presenting a solution for cleaning different types of grains, the invention sets out a most complex constructivity, that uses electro-mechanical and automation devices, raising the cost of production and maintenance.

Patent document WO 2018053897, entitled "COMBINE HARVESTER CAPABLE OF ADAPTIVE ADJUSTMENT, AND ADAPTIVE ADJUSTMENT METHOD', describes the use of scales with variable height such that different grain types and sizes can be cleaned. This characteristic is achieved with the use of sensors for identifying the grain sizes, and an electro-mechanical combination with motors and spindles controlled for opening or closing the aperture of the scales. Despite describing a screen with a height setting mechanism, the document sets out a complex solution, requiring the use of sensors and mechanisms to alter the height of the screen to be able to clean any grain type. The complex constructivity makes the production and maintenance cost system high. Moreover, this solution requires a complex modification for the harvester to work fully.

The Chinese patent document CN203661659, entitled "Device for adjusting sieve piece opening degree of cleaning sieve of combine harvester, as well as the document described previously, uses an electro-mechanical system for controlling the aperture of the scales, cleaning different grains with different sizes. Despite describing a screen with an adjustment mechanism, the document sets out a complex solution, requiring the use of sensors and mechanisms to alter the height of the screen to be able to clean any grain type. The complex constructivity makes the production and maintenance cost system high. Moreover, this solution requires a complex modification for the harvester to work fully.

North American patent document U.S. Pat. No. 9,699,971 entitled "Modified Sieve", describes the use of different types of scales on a same screen for cleaning different grain types and sizes that automatically offsets the inclination of the harvester based on the accidents and inclines of the land. However, the document is silent regarding the mechanical means, devices and arrangements that assure the feasibility of the automatic adjustment of the scales of the screens.

SUMMARY OF THE INVENTION

A first objective of the present invention is the improvement in universal scales applicable to a screen for harvester that serve for screens of any grain type or size. This characteristic is achieved from the improvement of the scales, which enables grains to be sorted, letting only clean grain pass through, while the waste can be discarded, as already occurs today. The scales comprise concave teeth, presenting high resistance to deformity, meaning the screen has a longer useful life, having lower maintenance cost. The higher and wider shaping brings greater resistance in scale, enabling the passage of bigger grains, its format helps better select the model of the grain to be harvested, and also it does not allow the passage of impurities greater than the sizes of the grains, as the aperture is uniform both below the concave reinforcement of the scale, and in the aperture between the concaves.

A second objective of the invention is a screen for harvester that is endowed with an improved adjustment mechanism of the scales. Accordingly, the user can utilize the screen in question for different types, geometry and size without the need to change it. The screen in question has a firmer structure, and incasements that enable the use of a mechanical adjustment mechanism easily accessed by the user. The mechanism has a lock to prevent drawbacks and repeated work by the user relative to the adjustment of the aperture of the scales. The invention provides precise adjustment of the aperture of the screen, with endless screw, and locking of the handle, preventing the drawback of involuntary closing or opening during harvesting. The implementation of this adjustment mechanism results in a reduction of weight of the combination and lower cost to open and close the scales, when compared to electric setting models. The adjustment mechanism is connected to the scales so as to enable the aperture size of the screen to be chosen and defined. Accordingly, the invention solves the difficulties of the state of the art relative to grains with different sizes and shapes, and the aperture can be adjusted without the need of mechanical maintenance.

A third objective of the invention is a method of adjusting the scales for harvesting screens that has simple movements for the aperture of the universal scales. Therefore, to adjust the profile to the harvester, the farmer merely needs a slight and simple adjustment at the front part of the structure of the screen which is arranged at the rear part of the harvester.

The characteristics of the invention mean the farmers do not need to change the screen every time they change the crop. Nor is there any need to make complex modifications to install an electro-mechanical grain identification system, as reported in the state of the art.

Therefore, the invention provides greater practicality in setting the scales, improved usage of the grains harvested, resulting in profitability in the harvest, agility and production gains. This is due to the fact that the screen of the invention can be used for any grain type and size, without the need to change scales between crops, electro-mechanical elements and complex modifications to the harvesters, influencing directly to improve the quality, save time and cost in the harvest.

Based on the proposed improvement, it is estimated that the cleaning area is increased by about 100% relative to scales for corn, and further, about 50% in relation to scales for soybean and small grains (wheat, oats, sorghum, rapeseed, etc.). The screen proposed surpasses the systems currently known in the state of the art, bearing in mind that the invention is designed for greater retention of residues (cob, pod, stalk fragment of the plants).

It is emphasized that on sloping terrain the design of the scale allows for adjustment and compatibility with the performance of the self-leveling screens, enabling improved usage of the sides of the scales, due to their arrangement. On flat or lightly sloping terrain, the yield of the universal scales is higher than self-leveling.

BRIEF DESCRIPTION OF THE DRAWINGS

For the present invention to be fully understood and put into practice by any person skilled in this field of technology, it is now clearly and fully described based on the accompanying drawings listed below:

FIG. 11—perspective view of a constructive option of the structure of the screen.

DETAILED DESCRIPTION OF THE INVENTION

Figures 1, 2:
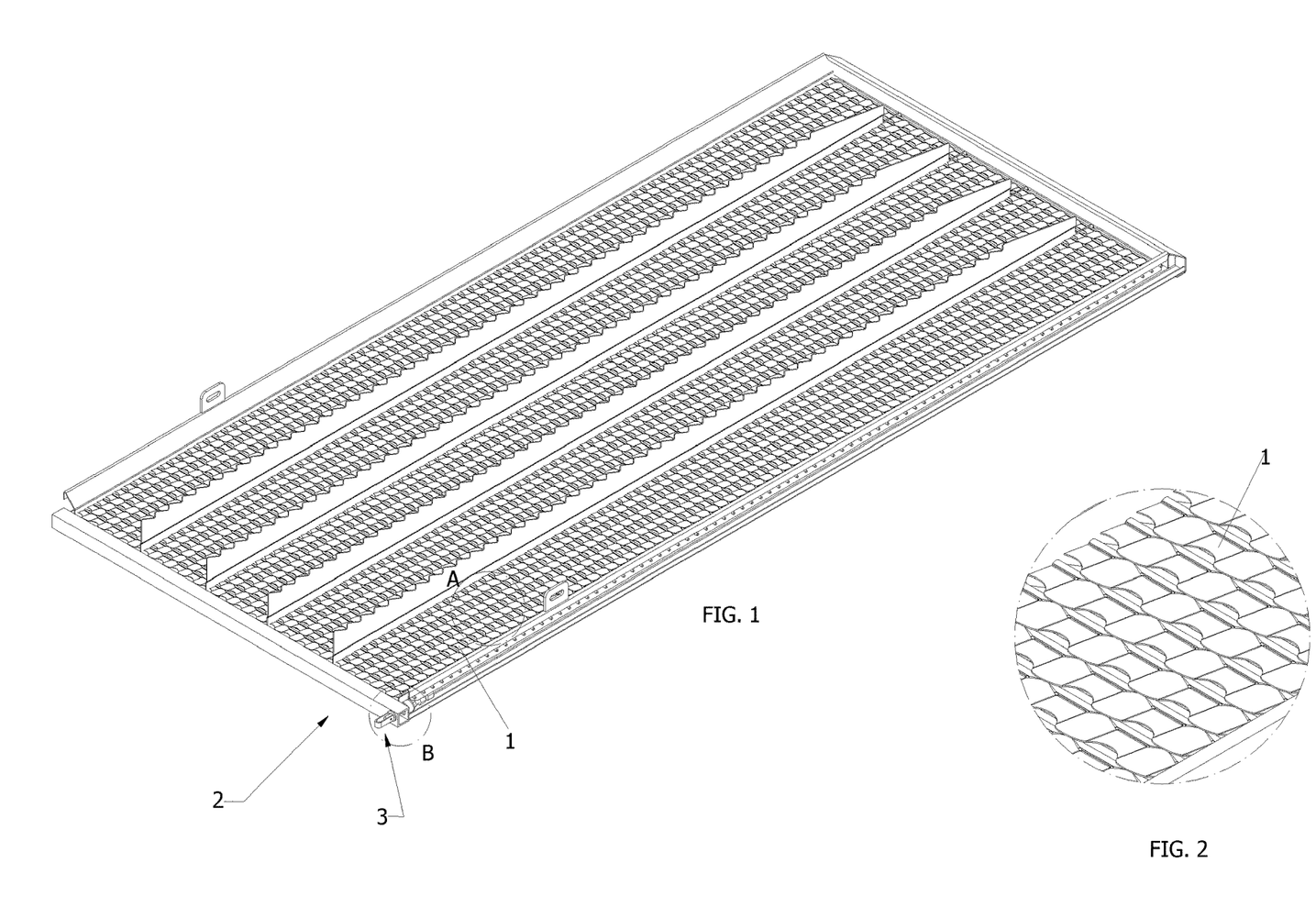
FIG. 1—perspective view of the screen.
FIG. 2—perspective view of detail A of FIG. 1.

FIGS. 1 and 2 illustrate the screen for harvesters of the invention comprising scales (1) that adapts to any grain type and size commonly reaped by the harvesters. The scales (1) are installed on the structure of the screen (2), comprising at least one adjustment mechanism (3).

Scales for a Grain Screen

Figure 3:
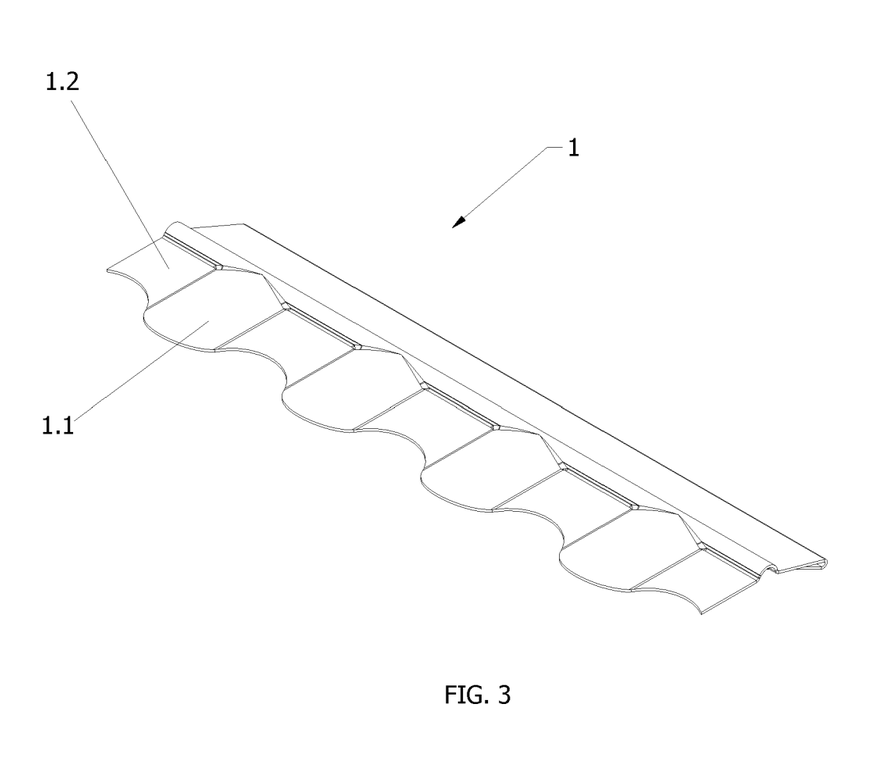
FIG. 3—perspective view of the scale in isolation.
Figure 4:
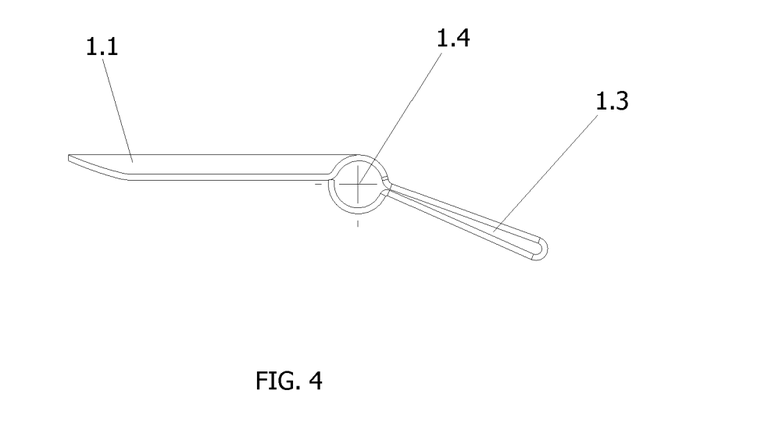
FIG. 4—side view of the scale in isolation.

To be able to cover the largest possible number of grain types, the scales (1), illustrated in FIGS. 3 and 4, consist of teeth (1.1), separated by bases (1.2). In order to facilitate adaptation to the different grain types, the teeth (1.1) are fluted, favoring the flow of the grains and hampering the passage of impurities, whereas the bases (1.2) are flat and intersperse the teeth (1.1). Additionally, the teeth (1.1) have greater resistance to deformity, meaning the screen has a longer useful life and lower maintenance cost. The scales (1) further present an inclined tab (1.3) on the rear portion which is overlapped by the front portion consisting of teeth (1.1) and base (1.2) that are designed for the passage of air from the ventilators contained in the harvester, guaranteeing the best circulation on the screen. The purpose of the ventilators is to help clean the grains, and the inclined tab (1.3) directs the airflow, improving the yield of the ventilators, being responsible for the improved results in grain cleaning. The scale (1) presents a channel (1.4) between an inclined tab (1.3) and the teeth (1.1) for the introduction of the shaft (3.1) to fasten and move each one of the scales (1).

For example, the sizes of the teeth (1.1) are 13 to 20 mm wide and 19 to 26 mm long. More preferably, the teeth (1.1) are 16.94 mm wide and 22.64 mm long. The bases (1.2) are 25 to 40 mm wide, preferably 33.1 mm. The inclined tab (1.3) has an inclination of 146 to 174°, preferably 160°.

Adjustable Grain Screen

Figure 5:
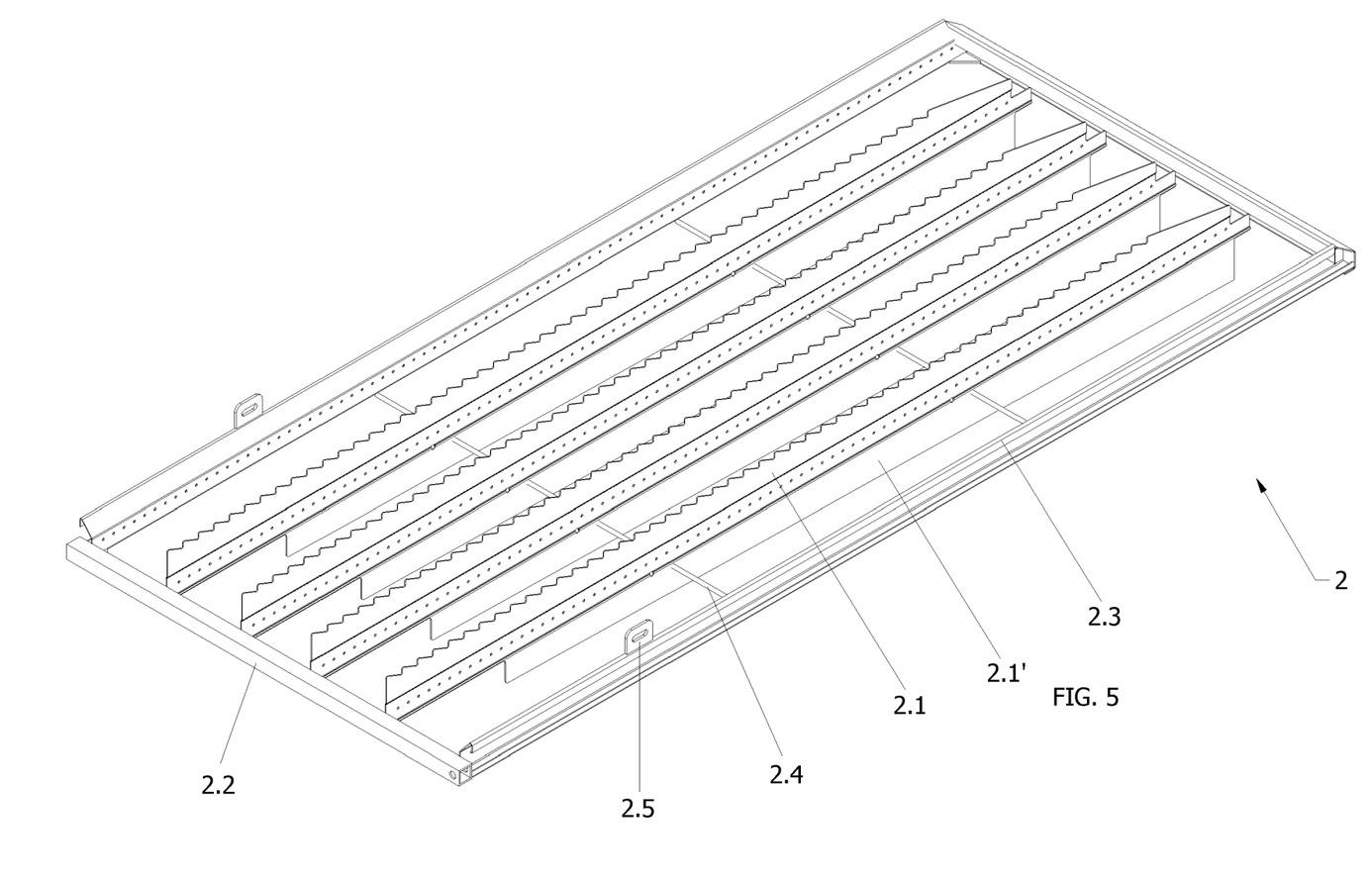
FIG. 5—perspective view of the structure of the screen.

FIG. 5 illustrates the structure of the screen (2) that comprises partitions (2.1) fastened at the ends (2.2) between the sides (2.3) of the structure (2), having reinforcement elements (2.4) installed on the lower part to enhance the firmness of the structure (2). The structure of the screen (2) also has supports (2.3) for mounting on conventional harvesters. The purpose of the partitions (2.1) is to divide the mass of grains to be screened by the scales (1), better distributing the grains over the screen and preventing the build-up thereof. Additionally, the partitions (2.1) conduct the air, preventing displacement of the grains towards the sides of the screen, when on sloping terrain. The lower (2.1') of the partitions (2.1) channel the airflow coming from the ventilators for improved performance.

Figure 6:
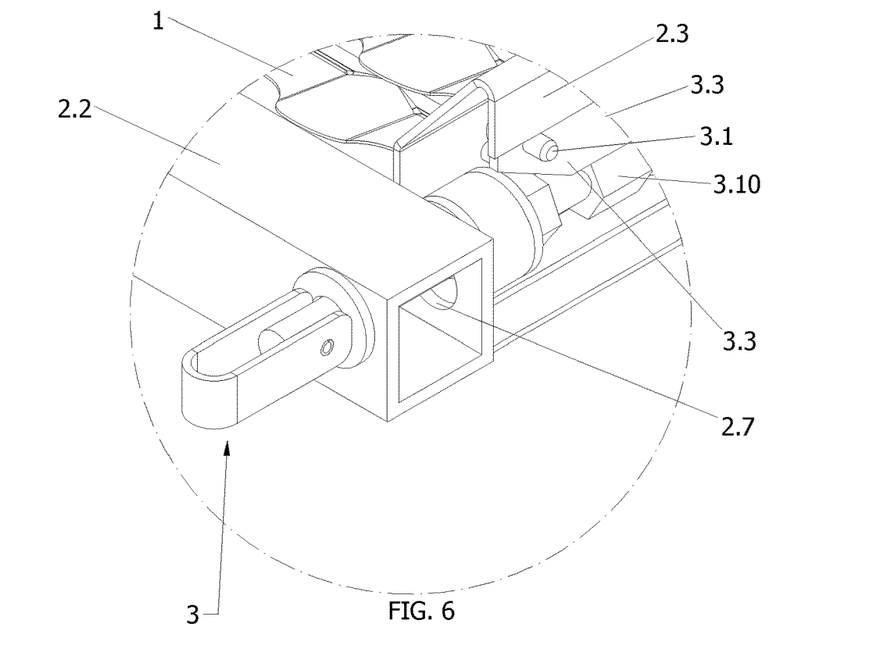
FIG. 6—perspective view of detail B of FIG. 1.
Figure 7:
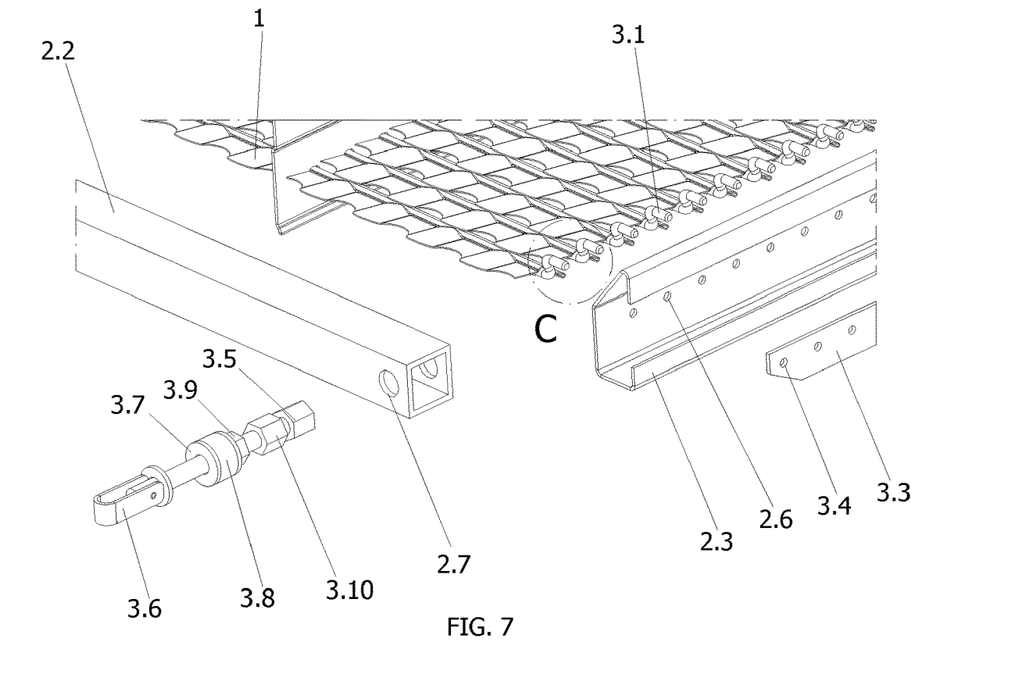
FIG. 7—blown-up perspective view of the adjustment mechanism of the scales.
Figure 8:
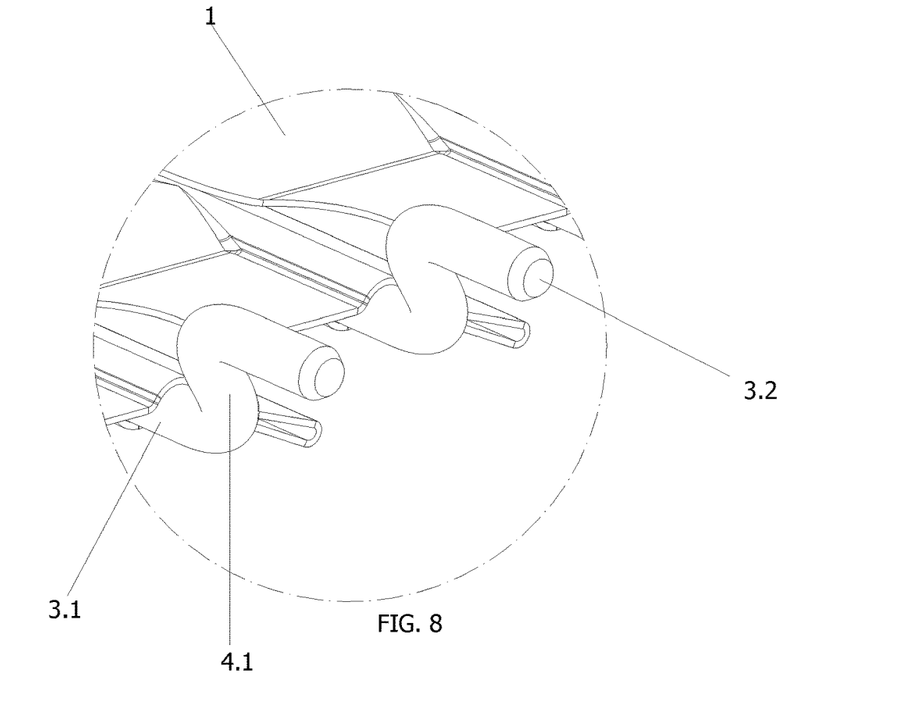
FIG. 8—perspective view of detail C of FIG. 7.

FIGS. 6 to 8 detail the adjustment mechanism of the scales (3) in the structure of the screen (2) comprising shafts (3.1) that rotate in orifices (2.6) positioned on the sides (2.3.) of the structure of the screen (2). The scales (1) are fastened on the shafts (3.1) by way of the channels (1.4), enabling the rotation command for setting the aperture of passage of the grains through the screen. After the orifices (2.6) of the side of the screen (2.3) the shafts (3.1) are S-shaped (3.2) for introduction into the orifices (3.4) of the ruler (3.3) positioned on the outer face of the side of the screen (2.3).

In one constructive option, the lateral (2.3) of the structure of the screen (2) may have orifices (2.6) measuring 2 to 6 mm in diameter, preferably 4 mm, being disposed every 18 to 22 mm, preferably every 20 mm. Additionally, the orifices (2.6) of the side (2.3) of the structure of the screen (2) may have the same constructive configuration of the orifices (3.4) of the ruler (3.3), to penetrate the free end of the shaft (3.1) without interference. Therefore, in this constructive option the orifices (3.4) are 2 to 6 mm in diameter, preferably 4 mm. Should more than one orifice (3.4) be used, they may be arranged every 18 to 22 mm, preferably every 20 mm.

FIG. 7 details the assembly of the adjustment mechanism (3) of the scales mounted on the structure of the screen (2), and one of its ends (2.2) has an orifice (2.7) where a spindle (3.5) endowed with a rotating lever (3.6) is mounted for commanding the rotary movement that enables the setting of the aperture of the scales (1) for different grain types and sizes.

Figure 9:
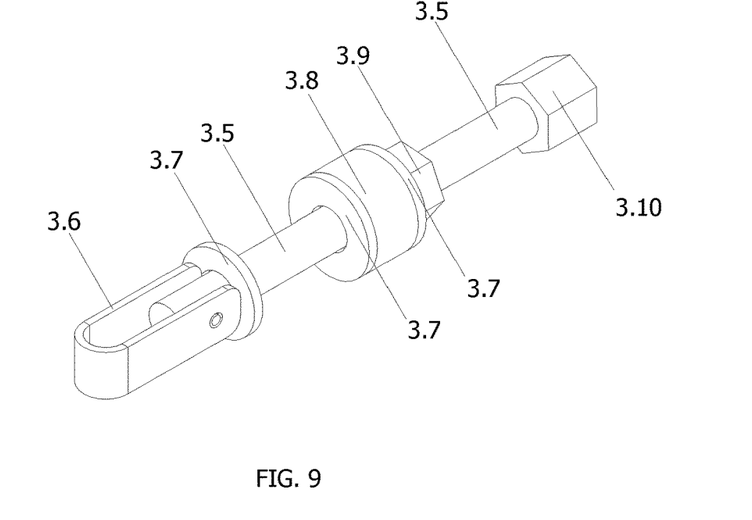
FIG. 9—perspective view of the scales adjustment mechanism.
Figure 10:
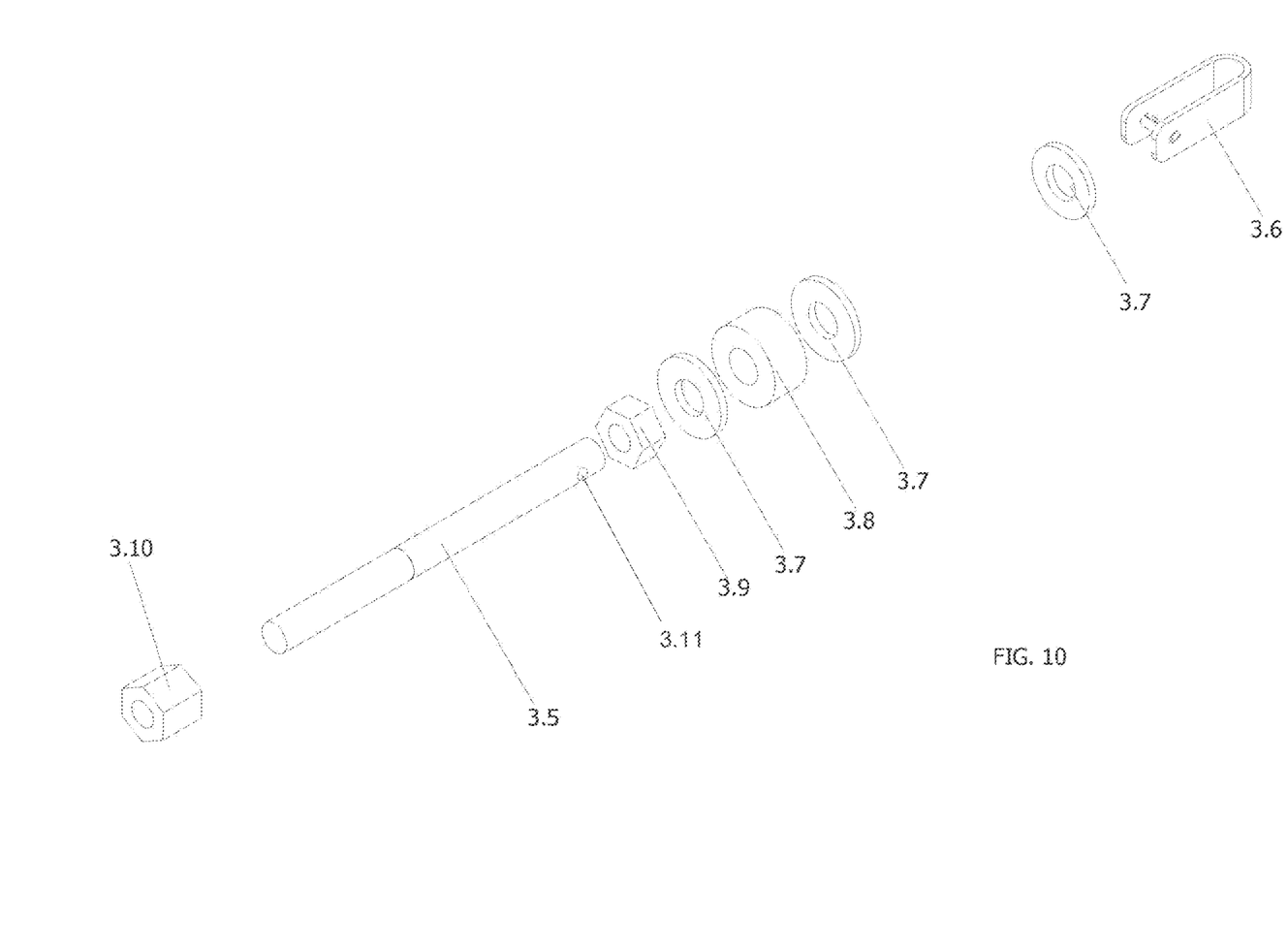
FIG. 10—blown-up perspective view of the scales adjustment mechanism.

As complemented in FIGS. 9 and 10, to prevent wear and tear between the rotating lever (3.6) of the spindle (3.5), having an eyelet (3.11), and the end (2.2) of the structure of the screen (2) a protective element (3.7) is installed. An elastic part (3.8), flanked by protective elements (3.7), is mounted on the spindle (3.5) by the opposite side of the end (2.2) of the structure of the screen (2), followed by a nut (3.9).

The rotating lever (3.6) also commands the locking of the rotary movement of the spindle (3.5) of the adjustment mechanism (3). Accordingly, the rotating lever (3.6) can be positioned horizontally or vertically, as represented in FIGS. 9 and 10, respectively. When in the horizontal position, the rotating lever (3.6) exerts pressure and expands the elastic part (3.8) locked by the nut (3.9), whereby the attrition is increased between adjustment mechanism (3) and structure of the screen (2), locking the rotary movement of the spindle (2). When the rotating lever (3.6) is in the vertical position, the pressure relief makes the elastic part (3.8) return to its original status, releasing the spindle (3.5) for rotating and setting the position of the scales (1).

Another nut (3.10) is threaded on the spindle (3.5) on which the ruler (3.3) is fastened, in whose orifices (3.4) the bent ends (3.2) of the shafts (3.1) of the scales (1) are mounted. For the adjustment mechanism (3) to be able to act on the scales (1), the ruler (3.3) is moved axially by the advance or retreat of the nut (3.10) obtained by the rotation of the spindle (3.5). Accordingly, through the rotation of the spindle (3.5), which is threaded, the nut (3.10) moves forward or backward, dragging the ruler (3.3) which produces the angular movement of the shafts (3.1) taking the scales (1) with them.

Method for Adjusting Scales for a Grain Screen

The method for adjusting the angular position of the scales (1) of the screen for harvesters comprises the following operations:

Execution of rotary movement of a spindle (3.5) supported in the structure of the screen (2);

Axial displacement of a nut (10) by rotary action of the spindle (3.5);

Drag of a ruler (3.3) endowed with orifices (3.4) that is connected to a nut (10), the orifices (3.4) being penetrated by the bent ends (3.2) of the shafts (3.1) of the scales;

Inclination control of the scales (1) that is responsible for the aperture of the screen by way of the angular movement of the shafts (3.1) generated by the axial movement of the ruler (3.3).

It is important to emphasize that the drawings and description are not intended to limit the embodiments of the inventive concept now proposed, but rather to illustrate and make the conceptual innovations disclosed in this solution comprehensible. Therefore, the descriptions and images should be interpreted in an illustrative—not limitative—manner, and there may be other equivalent or analog ways of implementing the inventive concept now disclosed and that do not stray from the scope of protection delineated in the solution proposed.

This specification depicts a scale for a grain screen, a grain screen with adjustment mechanism and method for adjusting scales for grain harvester screen, which are endowed with novelty, inventive activity, industrial application and are fully disclosed, whereby complying with the requirements for the grant of the privilege sought.

The invention claimed is:

1. An adjustable grain screen comprising:

partitions fixed at the ends between the sides of the screen structure and a mechanism for adjusting scales in said screen structure further comprising shafts rotating in orifices positioned at said sides of said screen structure, said scales being fixed on said shafts by way of channels, and after the orifices of said side of the screen said shafts have an S-shaped bend for introduction into said orifices of a ruler positioned on the outer face of the side of said screen, in whose orifices the bent ends of said shafts of said scales are mounted, said adjustable grain screen further comprising at one of the ends of the screen structure an orifice where a spindle with an eyelet is mounted for commanding its rotary movement, an elastic part flanked by protective elements being mounted on said spindle by the opposite side of the end of the structure of the screen, followed by a nut and said spindle having a second nut on which said ruler is fastened.

2. The adjustable grain screen according to claim 1, further comprising reinforcement elements installed on the lower part of said screen structure.

3. The adjustable grain screen according to claim 1, wherein said screen structure has supports for assembly on conventional harvesters.

* * * * *